(12) United States Patent
Matsen et al.

(10) Patent No.: US 10,016,947 B2
(45) Date of Patent: Jul. 10, 2018

(54) HIGH RATE PRODUCTION FIBER PLACEMENT SYSTEM AND METHOD

(71) Applicant: The Boeing Company, Chicago, IL (US)

(72) Inventors: Marc R. Matsen, Seattle, WA (US); Mark A. Negley, Bellevue, WA (US); Jeffery L. Marcoe, Bellevue, WA (US); Stephen G. Moore, Renton, WA (US); Brice A. Johnson, Federal Way, WA (US); Alexandra K. Dillon, Seattle, WA (US); Megan M. Petersen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 14/718,893

(22) Filed: May 21, 2015

(65) Prior Publication Data

US 2016/0339647 A1 Nov. 24, 2016

(51) Int. Cl.
*B29C 70/38* (2006.01)
*B29C 65/16* (2006.01)
*B29C 65/00* (2006.01)
*B29C 65/32* (2006.01)
*B29K 101/12* (2006.01)

(52) U.S. Cl.
CPC ............ *B29C 70/382* (2013.01); *B29C 65/16* (2013.01); *B29C 65/32* (2013.01); *B29C 66/8362* (2013.01); *B29C 66/87* (2013.01); *B29C 70/38* (2013.01); *B29K 2101/12* (2013.01)

(58) Field of Classification Search
CPC ... B29C 70/382; B29C 65/16; B29C 66/8362; B29C 70/38; B29C 65/32; B29C 66/87; B29K 2101/12
See application file for complete search history.

(56) References Cited

U.S. PATENT DOCUMENTS 5,015,326 A    5/1991   Frank
5,591,369 A *   1/1997   Matsen ................ B21D 26/021
                                                    219/603

(Continued)

OTHER PUBLICATIONS

Mondo et al., "Overview of Thermoplastic Composite ATL and AFP Technologies," Tencate Advanced Composites USA Inc. (2012).

(Continued)

*Primary Examiner* — Vishal I Patel
(74) *Attorney, Agent, or Firm* — Walters & Wasylyna LLC

(57) ABSTRACT

A fiber placement system including a fiber placement station at a first location, the fiber placement station including a tool and a fiber placement assembly configured to construct a reinforcement layup on the tool, the first fiber placement assembly including a compaction roller rotatable about an axis of rotation, the compaction roller at least partially defining a nip, a thermoplastic composite ply extending through the nip and a heating unit positioned to heat the thermoplastic composite ply proximate the nip, and a consolidation station at a consolidation location, the consolidation location being different from the first location, the consolidation station including a consolidation tool and a consolidation system configured to consolidate a reinforcement layup assembly that includes the reinforcement layup.

20 Claims, 6 Drawing Sheets

(56) References Cited

U.S. PATENT DOCUMENTS

| | | |
|---|---|---|
| 6,390,169 B1 | 5/2002 | Johnson |
| 6,451,152 B1 | 9/2002 | Holmes et al. |
| 6,799,619 B2 | 10/2004 | Holmes et al. |
| 6,814,822 B2 | 11/2004 | Holmes et al. |
| 8,388,884 B2 | 3/2013 | Nelson et al. |
| 2006/0048881 A1 | 3/2006 | Evans et al. |
| 2011/0011538 A1 | 1/2011 | Hamlyn et al. |
| 2011/0097575 A1* | 4/2011 | Pratte ............... B29C 70/086 428/336 |
| 2011/0240218 A1* | 10/2011 | Nelson ............... B29C 70/38 156/272.2 |
| 2015/0137427 A1* | 5/2015 | Matsen ............. B21D 26/033 264/403 |
| 2015/0174832 A1* | 6/2015 | Wollenweber ......... B29C 70/34 156/297 |

OTHER PUBLICATIONS

Lamontia et al., "Conformable Compaction System Used in Automated Fiber Placement of Large Composite Aerospace Structures," Accudyne Systems, Inc. (2002).

\* cited by examiner

US 10,016,947 B2

HIGH RATE PRODUCTION FIBER PLACEMENT SYSTEM AND METHOD

FIELD

This application relates to composite structures and, more particularly, to fiber-reinforced composite structures.

BACKGROUND

Fiber-reinforced composite structures are commonly used as high-strength, low-weight materials. A fiber-reinforced composite structure includes one or more composite layers, wherein each composite layer includes a reinforcement material and a matrix material. The reinforcement material may include fibers. The matrix material may be a polymeric material, such as a thermoset resin or a thermoplastic resin.

Fiber-reinforced composite structures are manufactured by laying up multiple layers of fiber tow to construct a reinforcement layup (also known as a preform). The fiber tow generally includes fibers (reinforcement material) impregnated with a matrix material. In fiber placement technologies, the fiber tow is generally supplied in tow or in slit tape form from a bulk reel and is pressed onto the underlying layup at a compaction nip using a compaction roller. The fully assembled reinforcement layup is then cured and/or consolidated to form the composite structure.

The curing or consolidation step is commonly performed in an autoclave. Specifically, the reinforcement layup and the associated tool are placed into an autoclave and heated to a predetermined temperature for a predetermined amount of time and then cooled, thereby yielding the final cured or consolidated part. The process can be time consuming and, thus, expensive. Furthermore, the tool upon which the reinforcement layup is assembled must be highly engineered to accommodate the autoclave process, thereby further increasing manufacturing costs.

Accordingly, those skilled in the art continue with research and development efforts in the field of fiber-reinforced composite structures.

SUMMARY

In one embodiment, the disclosed fiber placement system may include a fiber placement station at a first location, the fiber placement station including a tool and a fiber placement assembly configured to construct a reinforcement layup on the tool, the first fiber placement assembly including a compaction roller rotatable about an axis of rotation, the compaction roller at least partially defining a nip, and a heating unit positioned to supply heat proximate the nip, and a consolidation station at a consolidation location, the consolidation location being different from the first location, the consolidation station including a consolidation tool and a consolidation system configured to consolidate a reinforcement layup assembly that includes the reinforcement layup.

In one embodiment, the disclosed fiber placement method may include the steps of (1) constructing, at a first location, a first reinforcement layup including a thermoplastic matrix material; (2) assembling a reinforcement layup assembly including the first reinforcement layup; and (3) consolidating, at a consolidation location, the reinforcement layup assembly, wherein the consolidation location is different from the first location.

In another embodiment, the disclosed fiber placement method may include the steps of (1) constructing, at a first location, a first reinforcement layup including a first plurality of layers of thermoplastic composite ply, wherein the step of constructing the first reinforcement layup includes tacking together adjacent layers of the first plurality of layers; (2) constructing, at a second location different from the first location, a second reinforcement layup including a second plurality of layers of thermoplastic composite ply, wherein the step of constructing the second reinforcement layup includes tacking together adjacent layers of the second plurality of layers; and (3) consolidating, at a consolidation location, a reinforcement layup assembly including the first reinforcement layup and the second reinforcement layup, wherein the consolidation location is different from the first location and the second location.

In yet another embodiment, the disclosed fiber placement method may include the steps of (1) constructing, at a first location, a first reinforcement layup comprising increasing the tack of a thermoplastic matrix material; (2) constructing, at a second location, a second reinforcement layup comprising increasing the tack of a thermoplastic matrix material; and (3) consolidating, at a consolidation location, a reinforcement layup assembly comprising the first reinforcement layup and the second reinforcement layup, the consolidating including increasing a tack of the reinforcement layup assembly.

Other embodiments of the disclosed high rate production fiber placement system and method will become apparent from the following detailed description, the accompanying drawings and the appended claims.

DETAILED DESCRIPTION

The disclosed fiber placement system and method take advantage of the physical properties of thermoplastic composite materials—specifically the room temperature handleability of thermoplastic composite materials—to manufacture fiber-reinforced composite parts. As is described in greater detail herein, a fiber-reinforced composite part may be manufactured by consolidating a reinforcement layup assembly comprised of at least two remotely constructed reinforcement layups. Therefore, manufacturing production rate may be increased, while manufacturing costs may be decreased.

Figure 1:
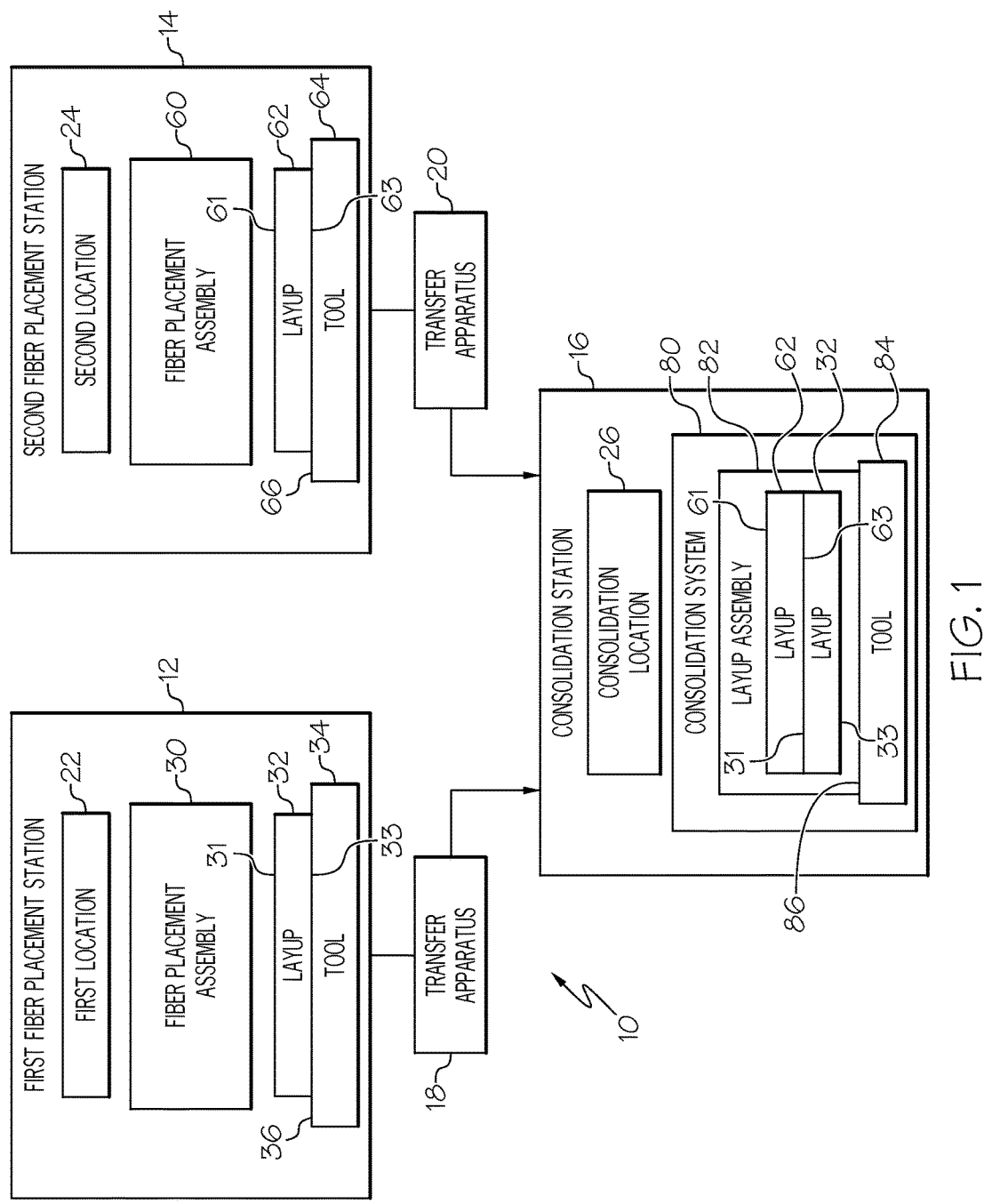
FIG. 1 is a schematic block diagram of one embodiment of the disclosed fiber placement system.

Referring to FIG. 1, one embodiment of the disclosed fiber placement system, generally designated 10, may include a first fiber placement station 12, a second fiber placement station 14, and a consolidation station 16. The fiber placement system 10 may additionally, though optionally, include a first transfer apparatus 18, which may be associated with the first fiber placement station 12, and a second transfer apparatus 20, which may be associated with the second fiber placement station 14. The fiber placement system 10 may include additional components and features without departing from the scope of the present disclosure.

While the fiber placement system 10 is shown and described having two fiber placement stations 12, 14, modifying the fiber placement system 10 to include three or more fiber placement stations, or only one fiber placement station (e.g., only fiber placement station 12), will not result in a departure from the scope of the present disclosure. Indeed, modifying the fiber placement system 10 to include fiber placement stations in addition to the two fiber placement stations 12, 14 shown in FIG. 1 may increase the production rate of the fiber placement system 10.

The first fiber placement station 12 may be at a first location 22, the second fiber placement station 14 may be at a second location 24, and the consolidation station 16 may be at a third, consolidation location 26. The first location 22 may be different from the second location 24, which may be different from the third location 26. As one example, the first, second and third locations 22, 24, 26 may be different physical locations within the same manufacturing facility. As another example, one of the first, second and third locations 22, 24, 26 may be at a first manufacturing facility while the other of the first, second and third locations 22, 24, 26 may be at a different, second manufacturing facility. As yet another example, the first and second locations 22, 24 may be at a first manufacturing facility (e.g., a layup facility), while the third location 26 may be at a different, second manufacturing facility (e.g., a consolidation facility).

The first fiber placement station 12 may include a first fiber placement assembly 30 that produces a first reinforcement layup 32. The first fiber placement assembly 30 may be any apparatus or system capable of constructing the first reinforcement layup 32.

The first fiber placement assembly 30 of the first fiber placement station 12 may lay up the first reinforcement layup 32 on a first tool 34. The first tool 34 may have a first tool surface 36 having a particular configuration, which may be simple (e.g., flat) or complex (e.g., various contours). The first reinforcement layup 32 may be laid up on the first tool surface 36 of the first tool 34 such that the first reinforcement layup 32 assumes the configuration of the first tool surface 36.

The first tool 34 may remain within the first fiber placement station 12 such that it is only used for construction of the first reinforcement layup 32. Because the first tool 34 is not used during consolidation, the first tool 34 need not be highly engineered like a tool that is used during consolidation. For example, the first tool 34 need not be capable of withstanding consolidation temperatures and need not have a coefficient of thermal expansion that closely corresponds to the coefficient of thermal expansion of the first reinforcement layup 32. As such, the manufacturing costs associated with the first tool 34 may be significantly less than the manufacturing costs associated with a traditional composite layup tool that participates in the consolidation process.

Figure 2:
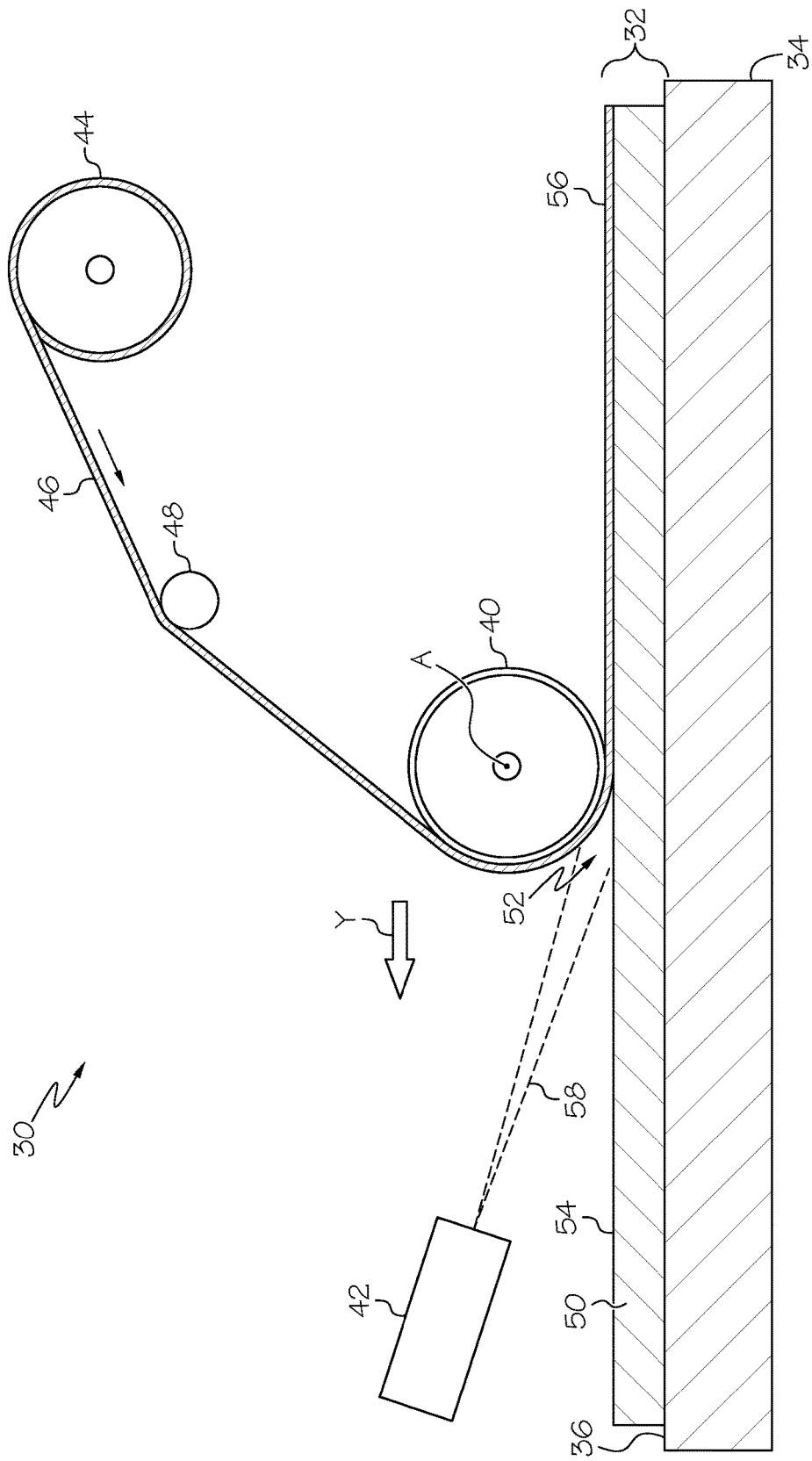
FIG. 2 is a schematic side elevational view of a fiber placement station of the fiber placement system of FIG. 1.

Referring to FIG. 2, in one particular implementation, the first fiber placement assembly 30 of the first fiber placement station 12 (FIG. 1) may include a compaction roller 40, a heating unit 42, and a bulk reel 44 of thermoplastic composite ply 46. The fiber placement assembly 30 may include various additional components, such as one or more guide rollers 48 for guiding the composite ply 46 from the bulk reel 44 to the compaction roller 40, without departing from the scope of the present disclosure.

Figure 6:
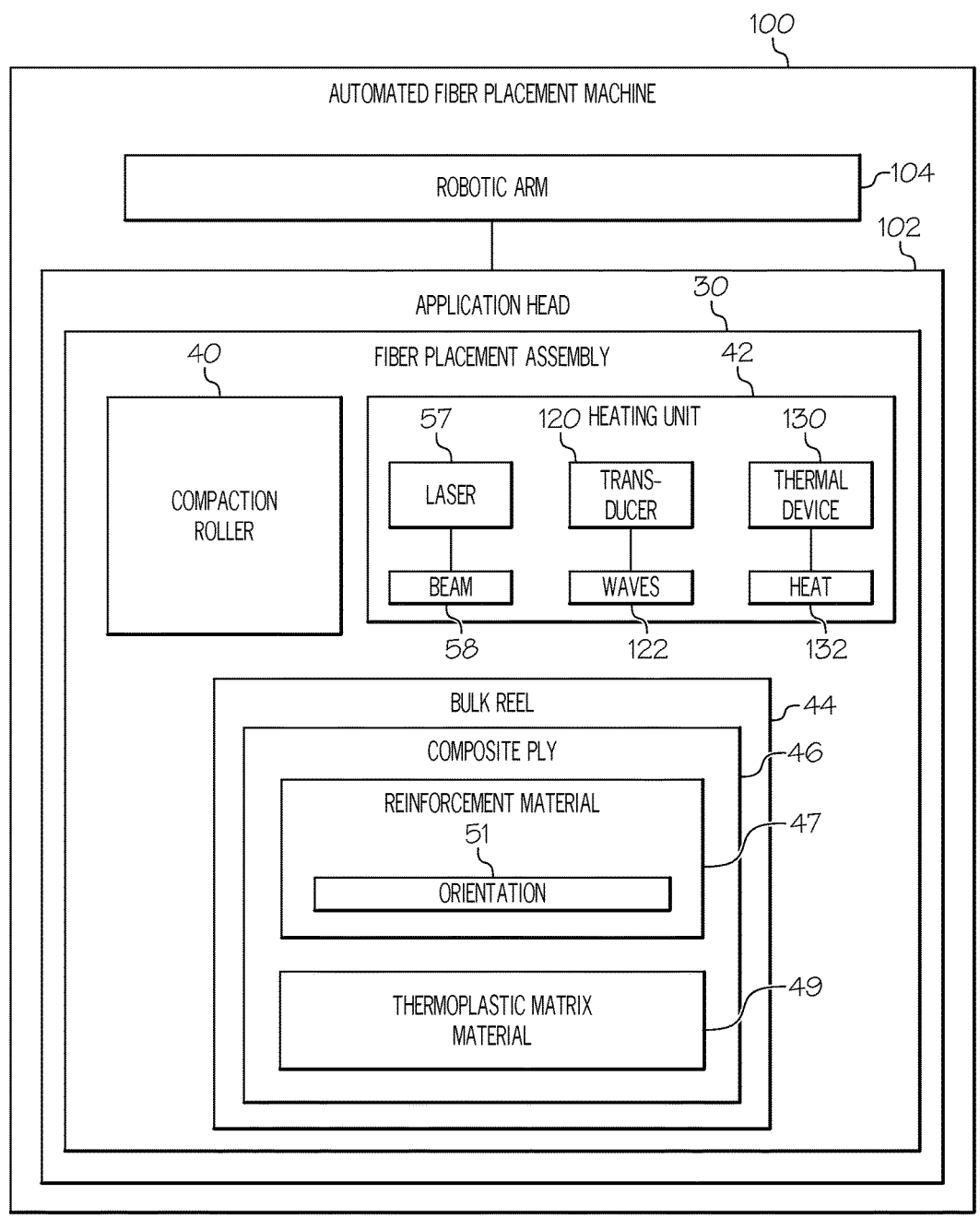
FIG. 6 is a schematic block diagram of an Automated Fiber Placement machine incorporating the fiber placement assembly of FIG. 2.

Referring to FIG. 6, the fiber placement assembly 30 may be associated with an Automated Fiber Placement (AFP) machine 100. For example, the compaction roller 40 of the fiber placement assembly 30 may be at least partially housed within the application head 102 of the Automated Fiber Placement machine 100. The application head 102 of the Automated Fiber Placement machine 100 may be moveable, such as by way of a robotic arm 104.

Still referring to FIG. 6, the composition of the thermoplastic composite ply 46 supplied from the bulk reel 44 of the fiber placement assembly 30 may vary depending on need/application. In one aspect, the thermoplastic composite ply 46 may be a fiber-reinforced material that includes a reinforcement material 47 and a thermoplastic matrix material 49. The reinforcement material 47 may be (or may include) fibers, such as carbon fibers. The reinforcement material 47 may have an orientation 51, such as a uni-directional orientation 51 or a multi-directional (e.g., bi-directional) orientation 51. Various thermoplastic matrix materials 49 may be used to form the thermoplastic composite ply 46. Specific examples of thermoplastic matrix materials 49 include, without limitation, polyether ether ketone (PEEK), polyether ketone ketone (PEKK), polyphenaline sulfide (PPS), polyethylene, polypropylene, and polystyrene. As one specific, non-limiting example, the thermoplastic composite ply 46 may be a thermoplastic tow (or slit tape). In another aspect, the thermoplastic composite ply 46 may be unreinforced (e.g., a resin-only material).

Referring back to FIG. 2, the compaction roller 40 of the fiber placement assembly 30 may be rotatable about an axis of rotation A (perpendicular to the page in FIG. 2), and may be positioned against a substrate 50 to define a nip 52 between the compaction roller 40 and the surface 54 of the substrate 50. The substrate 50 may be any structure or arrangement of material capable of receiving the thermoplastic composite ply 46 on the surface 54 thereof. As one example, the substrate 50 may include one or more previously applied layers of the thermoplastic composite ply 46 (e.g., the substrate 50 may be a partially assembled first reinforcement layup 32). As another example, the substrate 50 may be a neat resin film.

The thermoplastic composite ply 46 may be unwound from the bulk reel 44, may pass over the guide roller 48, may extend over the compaction roller 40, and may pass through the nip 52. As the thermoplastic composite ply 46 passes through the nip 52, the compaction roller 40 may urge the thermoplastic composite ply 46 against the surface 54 of the substrate 50. Furthermore, as the compaction roller 40 moves relative to the substrate 50 (e.g., in the direction shown by arrow Y), a composite layer 56 may be formed over the surface 54 of the substrate 50. Multiple layers 56 may be applied to the substrate 50 in this manner. Therefore, the first reinforcement layup 32 may include two or more tacked-together layers 56 of the thermoplastic composite ply 46.

The heating unit 42 of the fiber placement assembly 30 may be positioned to heat a portion of the thermoplastic composite ply 46 and/or a portion of the substrate 50, such as just prior to, or simultaneously with, those portions of the thermoplastic composite ply 46 and the substrate 50 passing through the nip 52. The heat supplied by the heating unit 42 may soften and, thus, increase the tack of the thermoplastic matrix material 49 of the thermoplastic composite ply 46 and/or the substrate 50, thereby rendering it tacky and facilitating adhesion between the thermoplastic composite ply 46 and the substrate 50. As such, the layers of thermoplastic composite ply 46 that form the first reinforcement layup 32 may be tacked together.

In one construction, the heating unit 42 of the fiber placement assembly 30 may be (or may include) a laser 57 (FIG. 6). Therefore, the heating unit 42 may emit a beam 58 of electromagnetic radiation proximate (at or near) the compaction roller 40, such as proximate the nip 52 between the compaction roller 40 and the substrate 50, to effect tacking of the thermoplastic composite ply 46 to the substrate 50. The laser beam 58 may be concentrated into a relatively small spot on the thermoplastic composite ply 46 and/or the substrate 50. The spacing between the heating unit 42 and the nip 52 and/or the divergence of the laser beam 58 may be controlled to achieve the desired spot size on the thermoplastic composite ply 46 and/or the substrate 50.

The beam 58 of electromagnetic radiation emitted by the heating unit 42 has a wavelength. The wavelength of the beam 58 may be a design consideration. In one expression, the beam 58 may have a wavelength ranging from about 0.75 μm to about 1.4 μm (near-infrared (NIR)). In another expression, the beam 58 may have a wavelength ranging from about 1.4 μm to about 3 μm (short-wavelength infrared (SWIR)). In another expression, the beam 58 may have a wavelength ranging from about 3 μm to about 8 μm (mid-wavelength infrared (MWIR)). In another expression, the beam 58 may have a wavelength ranging from about 8 μm to about 15 μm (long-wavelength infrared (LWIR)). In yet another expression, the beam 58 may have a wavelength ranging from about 15 μm to about 1,000 μm (far-infrared (FIR)).

Referring to FIG. 6, in one alternative construction, the heating unit 42 of the fiber placement assembly 30 may be (or may include) an ultrasound transducer 120. Therefore, the heating unit 42 may emit ultrasonic waves 122 proximate the compaction roller 40, such as proximate the nip 52 (FIG. 2) between the compaction roller 40 and the substrate 50 (FIG. 2), to effect tacking of the thermoplastic composite ply 46 to the substrate 50 by way of ultrasonic welding.

In another alternative construction, the heating unit 42 of the fiber placement assembly 30 may be (or may include) a thermal device 130. Therefore, the heating unit 42 may transfer heat 132 to the thermoplastic composite ply 46 and/or the substrate 50 (FIG. 2) (e.g., by way of thermal conduction and/or thermal convection), thereby effecting tacking of the thermoplastic composite ply 46 to the substrate 50.

Thus, referring to FIGS. 1 and 2, the first fiber placement assembly 30 of the first fiber placement station 12 may yield a first reinforcement layup 32 that is comprised of multiple interconnected (e.g., tacked together) layers of thermoplastic composite ply 46. Because the first reinforcement layup 32 is comprised of thermoplastic matrix material 49 (FIG. 6), the first reinforcement layup 32 is handleable at temperatures below the glass transition temperature of the thermoplastic matrix material 49 (e.g., at room temperature (25° C.)). As such, the first reinforcement layup 32 may be moveable from the first fiber placement station 12 to the consolidation station 16 (FIG. 1), such as by way of the associated transfer apparatus 18.

Referring to FIG. 1, the second fiber placement station 14 of the disclosed fiber placement system 10 may include a second fiber placement assembly 60 that produces a second reinforcement layup 62. The second fiber placement assembly 60 may be any apparatus or system capable of constructing the second reinforcement layup 62. The second fiber placement assembly 60 may operate independently of the first fiber placement assembly 30.

The second fiber placement assembly 60 of the second fiber placement station 14 may lay up the second reinforcement layup 62 on a second tool 64. The second tool 64 may have a second tool surface 66 having a particular configuration, which may be simple (e.g., flat) or complex (e.g., various contours). The second reinforcement layup 62 may be laid up on the second tool surface 66 of the second tool 64 such that the second reinforcement layup 62 assumes the configuration of the second tool surface 36.

The second tool 64 may remain within the second fiber placement station 14 such that it is only used for constructing the second reinforcement layup 62. Because the second tool 64 is not used during consolidation, the second tool 64 need not be highly engineered like a tool that is used during consolidation. For example, the second tool 64 need not be capable of withstanding consolidation temperatures and need not have a coefficient of thermal expansion that closely corresponds to the coefficient of thermal expansion of the second reinforcement layup 62. As such, the manufacturing costs associated with the second tool 64 may be significantly less than the manufacturing costs associated with a traditional composite layup tool that participates in the consolidation process.

The second fiber placement assembly 60 of the second fiber placement station 14 may be configured in the same manner (or in a similar manner) as the first fiber placement assembly 30 of the first fiber placement station 12, which is shown in FIG. 2. For example, the second fiber placement assembly 60 may include a compaction roller (see compaction roller 40 in FIG. 2), a heating unit (see heating unit 42 in FIG. 2), and a supply of thermoplastic composite ply (see thermoplastic composite ply 46 in FIG. 2).

Thus, the second fiber placement assembly 60 of the second fiber placement station 14 may yield a second reinforcement layup 62 that is comprised of multiple interconnected (e.g., tacked together) layers of thermoplastic composite ply (see thermoplastic composite ply 46 in FIG. 2). Because the second reinforcement layup 62 is comprised of thermoplastic matrix material 49, the second reinforcement layup 62 is handleable at temperatures below the glass transition temperature of the thermoplastic matrix material 49 (e.g., at room temperature (25° C.)). As such, the second reinforcement layup 62 may be moveable from the second fiber placement station 14 to the consolidation station 16, such as by way of the associated transfer apparatus 20.

The transfer apparatus 18, 20 of the fiber placement system 10 may include any device or system capable of moving reinforcement layups 32, 62 from the tools 34, 64 of the fiber placement stations 12, 14 to the tool 84 of the consolidation station 16. As one specific, non-limiting example, the transfer apparatus 18, 20 may be (or may include) a pick-and-place robot. While each fiber placement station 12, 14 is shown having its own associated transfer apparatus 18, 20, those skilled in the art will appreciate that a single transfer apparatus (e.g., only transfer apparatus 18) may service two or more fiber placement stations (e.g., fiber placement stations 12, 14) without departing from the scope of the present disclosure.

Still referring to FIG. 1, the consolidation station 16 of the disclosed fiber placement system 10 may include a consolidation system 80. The consolidation system 80 may supply heat (by any suitable means) to consolidate a reinforcement layup assembly 82 that includes the first reinforcement layup 32 (from the first fiber placement station 12) and the second reinforcement layup 62 (from the second fiber placement station 14). The reinforcement layup assembly 82 may be assembled by stacking (e.g., by way of the transfer apparatus 18, 20) the first and second reinforcement layups 32, 62.

At this point, those skilled in the art will appreciate that the first reinforcement layup 32 will have an upper surface 31 and a lower surface 33 and the second reinforcement layup 62 will have an upper surface 61 and lower surface 63. The lower surface 63 of the second reinforcement layup 62 may be sized and shaped to fit on top of, and mate with, the upper surface 31 of the first reinforcement layup 32. As such, the first reinforcement layup 32 may be stackable (e.g., flushly stackable) with the second reinforcement layup 62 in the consolidation station 16 to yield the reinforcement layup assembly 82.

The consolidation system 80 of the consolidation station 16 may include a consolidation tool 84. The reinforcement layup assembly 82 may be assembled on the consolidation tool 84. The consolidation tool 84 may have a consolidation tool surface 79 having a particular shape, which may be dictated by the shape of the reinforcement layup assembly 82, which in turn may be dictated by the shapes of the reinforcement layups 32, 62 comprising the reinforcement layup assembly 82. Therefore, the reinforcement layup assembly 82 may be assembled on the consolidation tool surface 79 of the consolidation tool 84 such that the reinforcement layup assembly 82 retains (or assumes) the desired configuration during consolidation.

Figure 3:
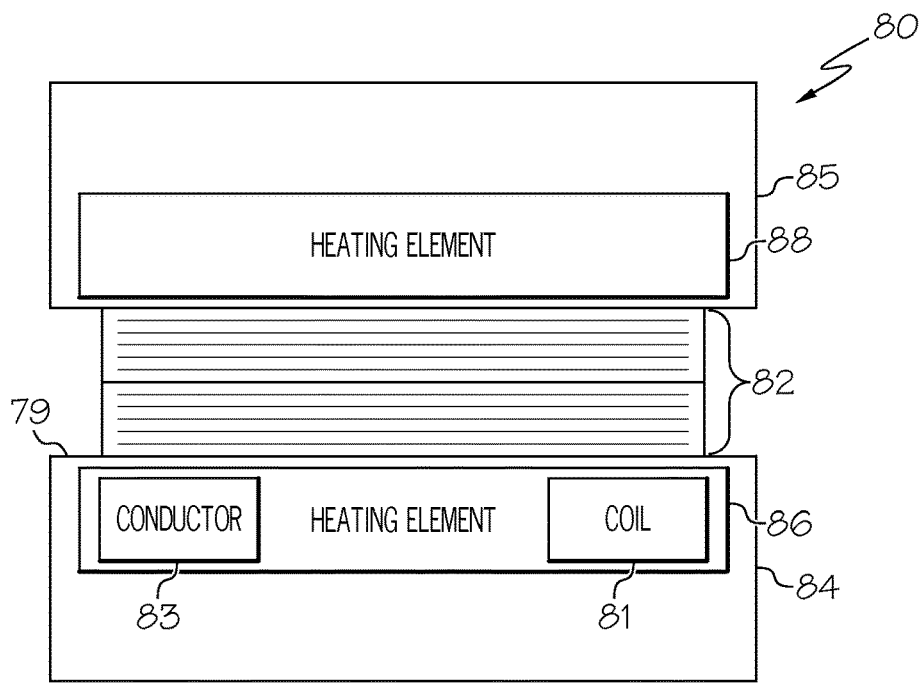
FIG. 3 is a schematic side elevational view of a consolidation station of the fiber placement system of FIG. 1, shown prior to consolidation.

As shown in FIG. 3, in one particular implementation, the consolidation system 80 of the consolidation station 16 may include an opposed pair of consolidation tools 84, 85. The reinforcement layup assembly 82 may be positioned between the opposed consolidation tools 84, 85. Optionally, the reinforcement layup assembly 82 may be compressed between the opposed consolidation tools 84, 85, such as by applying a compression force to one (or both) of the consolidation tools 84, 85. Compression may reduce (if not eliminate) slippage of the reinforcement layups 32, 62 comprising the reinforcement layup assembly 82 prior to consolidation.

Figure 4:
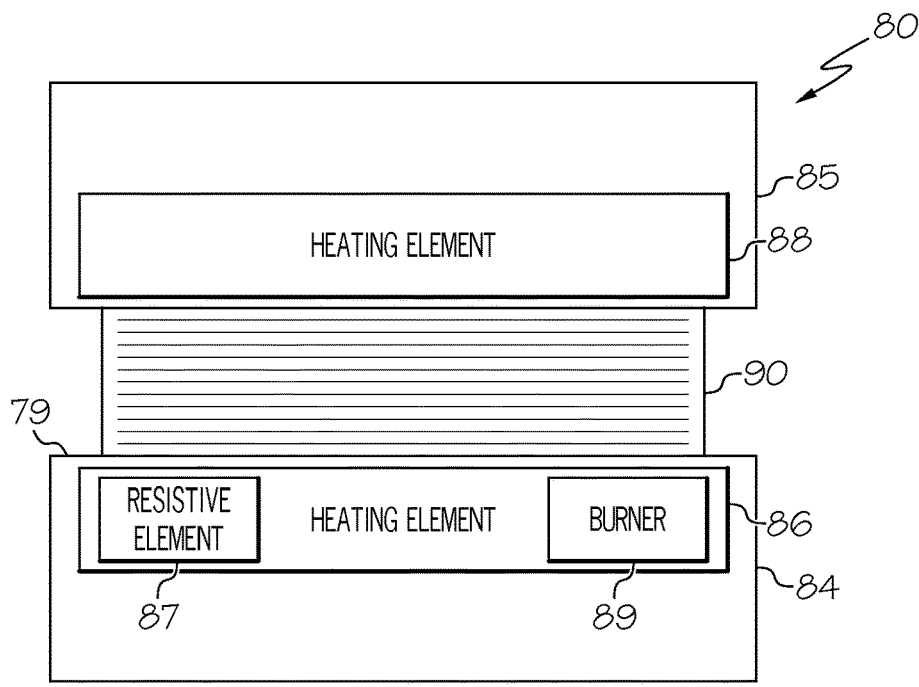
FIG. 4 is a schematic side elevational view of the consolidation station of FIG. 3, shown after consolidation.

Referring to FIGS. 3 and 4, the consolidation system 80 of the consolidation station 16 may include one or more heating elements 86, 88 for heating the reinforcement layup assembly 82 (FIG. 3) to yield a consolidated part 90 (FIG. 4). While FIGS. 3 and 4 show the heating elements 86, 88 incorporate into the consolidation tools 84, 85, using heating elements 86, 88 that are separate from the consolidation tools 84, 85 is also contemplated and will not result in a departure from the scope of the present disclosure.

The consolidation system 80 may employ various techniques/processes to heat and consolidate the reinforcement layup assembly 82 (FIG. 3) to yield a consolidated part 90 (FIG. 4). As one specific, non-limiting example, the heating elements 86, 88 of the consolidation system 80 may be (or may include) induction coils 81 (FIG. 3) that generate heat in a conductor 83 (FIG. 3) by way of electromagnetic induction. The consolidation tools 84, 85 may include the conductor 83 (e.g., proximate the surface 79 of consolidation tool 84) such that the consolidation tools 84, 85 are heated by the induction-based heating elements 86, 88 during the consolidation process. As another specific, non-limiting example, the heating elements 86, 88 of the consolidation system 80 may be (or may include) a resistive heating element 87 (FIG. 4) that generates heat when an electric current is passed therethrough. As yet another specific, non-limiting example, the heating elements 86, 88 of the consolidation system 80 may be (or may include) a burner, such as gas fuel burner 89 (FIG. 4) associated with an oven or autoclave.

Thus, referring back to FIG. 1, the consolidation station 16 of the disclosed fiber placement system 10 may receive reinforcement layups 32, 62 from one or more fiber placement stations 12, 14 by way of transfer apparatus 18, 20. Therefore, the consolidation station 16 may be spatially separated from the fiber placement stations 12, 14. At the consolidation station 16, the reinforcement layups 32, 62 may be assembled into a reinforcement layup assembly 82, which may be consolidated to yield a consolidated part 90 (FIG. 4).

Also disclosed is a fiber placement method 200, which may be used to manufacture a fiber-reinforced composite part 90 (FIG. 4). The disclosed fiber placement method 200 takes advantage of the handleability of the thermoplastic composite materials by constructing reinforcement layups 32, 62 at one or more locations 22, 24 and then moving the reinforcement layups 32, 62 to a different, consolidation location 26. At the consolidation location 26, the reinforcement layups 32, 62 are assembled into a reinforcement layup assembly 82, which is then consolidated to yield a fiber-reinforced composite part 90.

Figure 5:
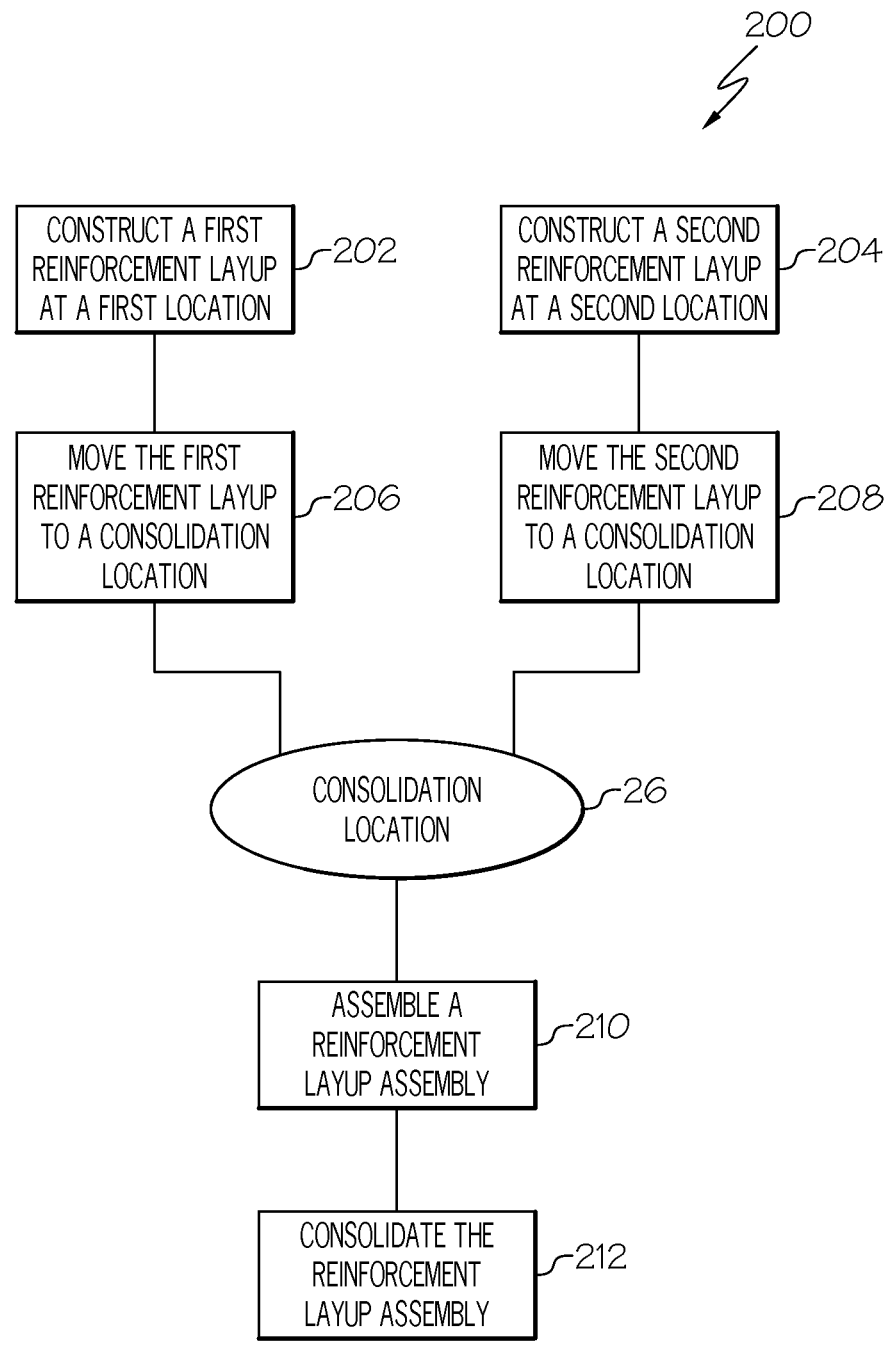
FIG. 5 is a flow diagram depicting one embodiment of the disclosed fiber placement method.

Referring to FIG. 5, with additional reference to FIG. 1, one embodiment of the disclosed fiber placement method 200 may begin at Block 202 with the step of constructing a first reinforcement layup 32 at a first location 22. At Block 204, a second reinforcement layup 62 may be constructed at a second location 24. Optionally, additional reinforcement layups may be constructed at other additional locations.

At Block 206, the first reinforcement layup 32 may be moved from the first location 22 to a consolidation location 26. Likewise, at Block 208, the second reinforcement layup 62 may be moved from the second location 24 to a consolidation location 26. In the event that other additional reinforcement layups were constructed at other additional locations, additional steps would include moving those reinforcement layups to the consolidation location 26.

At Block 210, the first reinforcement layup 32 and the second reinforcement layup 62 may be assembled into a reinforcement layup assembly 82. In the event that other additional reinforcement layups were constructed, those additional reinforcement layups may be included in the reinforcement layup assembly 82.

At Block 212, the reinforcement layup assembly 82 may be consolidated. Consolidation may be effected using various techniques capable of suitably heating the reinforcement layup assembly 82. As one example, consolidation may be effected using induction heating. As another example, consolidation may be effected using resistive heating. As yet another example, consolidation may be effected in an autoclave.

Accordingly, the disclosed fiber placement system 10 and fiber placement method 200 spatially separate layup from consolidation. As such, the production rate may be increased. Furthermore, because the tool 84 used during consolidation (Block 212) is different from the tools 34, 64 used during layup (Blocks 202, 204), manufacturing costs may be decreased.

Figure 7:
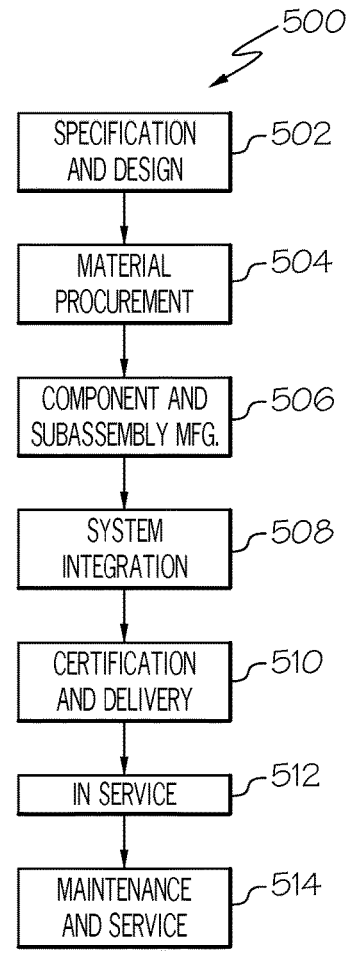
FIG. 7 is a flow diagram of an aircraft manufacturing and service methodology.
Figure 8:
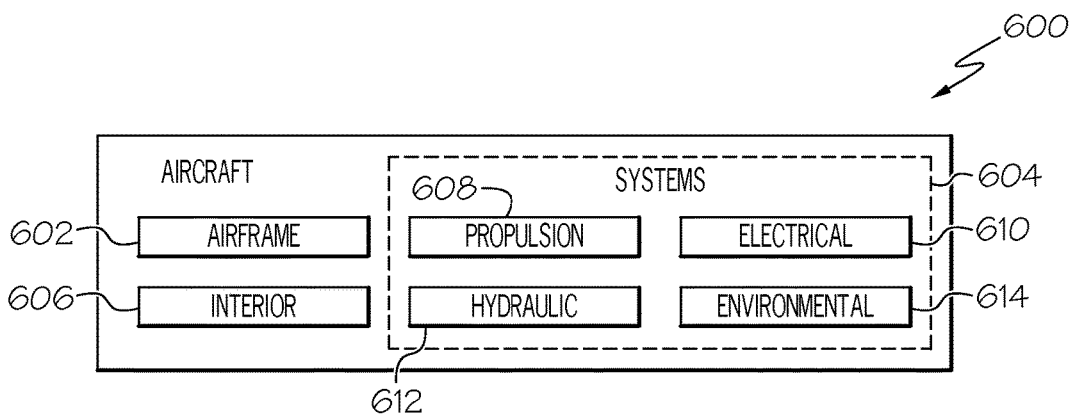
FIG. 8 is a block diagram of an aircraft.

Examples of the present disclosure may be described in the context of an aircraft manufacturing and service method 500 as shown in FIG. 7 and an aircraft 600 as shown in FIG. 8. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place. Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc. of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 600 produced by illustrative method 500 (FIG. 7) may include airframe 602 with a plurality of high-level systems 604 and interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed high rate production fiber placement system and method may be employed during any one or more of the stages of the manufacturing and service method 500. For example, components or subassemblies corresponding to component and subassembly manufacturing (block 506) may be fabricated or manufactured using the disclosed high rate production fiber placement system and method. Also, the disclosed high rate production fiber placement system and method may be utilized during production stages (blocks 506 and 508), for example, by substantially expediting assembly of or reducing the cost of aircraft 600, such as the airframe 602 and the interior 606. Similarly, the disclosed high rate production fiber placement system and method may be utilized, for example and without limitation, while aircraft 600 is in service (block 512) and/or during the maintenance and service stage (block 514).

Although various embodiments of the disclosed high rate production fiber placement system and method have been shown and described, modifications may occur to those skilled in the art upon reading the specification. The present application includes such modifications and is limited only by the scope of the claims.

What is claimed is:

1. A fiber placement method comprising:
    constructing, at a first location, a first reinforcement layup comprising a thermoplastic matrix material;
    assembling a reinforcement layup assembly comprising said first reinforcement layup and at least one more reinforcement layup; and
    consolidating, at a consolidation location, said reinforcement layup assembly, wherein said consolidation location is different from said first location.

2. The method of claim 1 wherein said first reinforcement layup comprises a plurality of layers, each layer of said plurality of layers comprising said thermoplastic matrix material.

3. The method of claim 2 wherein said constructing step comprises heating said thermoplastic matrix material to tack together said plurality of layers.

4. The method of claim 3 wherein said heating is performed by a laser beam.

5. The method of claim 1 wherein said thermoplastic matrix material comprises at least one of polyether ether ketone, polyether ketone ketone, polyphenaline sulfide, polyethylene, polypropylene and polystyrene.

6. The method of claim 1 wherein said assembling step is performed at said consolidation location.

7. The method of claim 1 wherein said assembling step is performed by a pick-and-place robot.

8. The method of claim 1 further comprising constructing, at a second location, a second reinforcement layup comprising a thermoplastic matrix material, wherein said reinforcement layup assembly comprises said first reinforcement layup and said second reinforcement layup.

9. The method of claim 8 wherein said reinforcement layup assembly is assembled by stacking said second reinforcement layup on said first reinforcement layup.

10. The method of claim 1 wherein said consolidating step comprises heating said reinforcement layup assembly by electromagnetic induction.

11. A fiber placement method comprising:
    constructing, at a first location, a first reinforcement layup comprising a first plurality of layers of thermoplastic composite ply, wherein said step of constructing said first reinforcement layup comprises tacking together adjacent layers of said first plurality of layers;
    constructing, at a second location different from said first location, a second reinforcement layup comprising a second plurality of layers of thermoplastic composite ply, wherein said step of constructing said second reinforcement layup comprises tacking together adjacent layers of said second plurality of layers; and
    consolidating, at a consolidation location, a reinforcement layup assembly comprising said first reinforcement layup and said second reinforcement layup, said consolidation location being different from said first location and said second location.

12. The method of claim 11 wherein said tacking is effected with heat.

13. The method of claim 12 wherein said heat is supplied by a laser beam.

14. A fiber placement method comprising:
    constructing, at a first location, a first reinforcement layup comprising increasing a tack of a thermoplastic matrix material of said first reinforcement layup;
    constructing, at a second location, a second reinforcement layup comprising increasing a tack of a thermoplastic matrix material of said second reinforcement layup; and
    consolidating, at a consolidation location, a reinforcement layup assembly comprising said first reinforcement layup and said second reinforcement layup, said consolidating comprising increasing a tack of said reinforcement layup assembly.

15. The fiber placement method of claim 14 wherein said tack of said thermoplastic matrix material of said first reinforcement layup is increased by supplying heat to said thermoplastic matrix material.

16. The fiber placement method of claim 15 wherein said heat is supplied by a laser beam.

17. The fiber placement method of claim 14 wherein said tack of said thermoplastic matrix material of said second reinforcement layup is increased by supplying heat to said thermoplastic matrix material.

18. The fiber placement method of claim 14 wherein said tack of said reinforcement layup assembly is increased by supplying heat to said reinforcement layup assembly.

19. The fiber placement method of claim 14 wherein said first reinforcement layup comprises a upper surface and a lower surface, wherein said second reinforcement layup comprises a upper surface and a lower surface, and wherein said lower surface of said second reinforcement layup is sized and shaped to fit on top of, and mate with, said upper surface of said first reinforcement layup.

20. The method of claim 14 wherein said thermoplastic matrix material comprises at least one of polyether ether ketone, polyether ketone ketone, polyphenaline sulfide, polyethylene, polypropylene and polystyrene.

* * * * *